(12) United States Patent
Andreani et al.

(10) Patent No.: US 9,958,103 B1
(45) Date of Patent: May 1, 2018

(54) INTERNAL ANTICORROSIVE AND ABRASIVE RESISTANT PROTECTION COATING FOR STEEL PIPES

(71) Applicant: PATAGONIA SHALE SERVICES S.A., Ciudad de Buenos Aires (AR)

(72) Inventors: Adrian Andreani, Ciudad de Buenos Aires (AR); Federico Noriega, Ciudad de Buenos Aires (AR)

(73) Assignee: Patagonia Shale Services S.A., Ciudad de Buenos Aires (AR)

(*) Notice: Subject to any disclaimer, the term of this patent is extended or adjusted under 35 U.S.C. 154(b) by 0 days. days.

(21) Appl. No.: 15/626,227

(22) Filed: Jun. 19, 2017

(51) Int. Cl.
*F16L 58/10* (2006.01)
*B32B 15/092* (2006.01)
*B32B 27/32* (2006.01)
*B32B 7/12* (2006.01)
*B32B 1/08* (2006.01)
*F16L 9/14* (2006.01)

(52) U.S. Cl.
CPC ............ *F16L 58/1009* (2013.01); *B32B 1/08* (2013.01); *B32B 7/12* (2013.01); *B32B 15/092* (2013.01); *B32B 27/32* (2013.01); *F16L 9/14* (2013.01); *B32B 2307/714* (2013.01)

(58) Field of Classification Search
CPC ...... F16L 58/1009; F16L 9/14; B32B 15/092; B32B 27/32; B32B 7/12; B32B 1/08; B32B 2307/714
See application file for complete search history.

(56) References Cited

U.S. PATENT DOCUMENTS

2016/0289497 A1* 10/2016 Lee .................. C08L 77/00

* cited by examiner

*Primary Examiner* — Michael C Miggins
(74) *Attorney, Agent, or Firm* — Defillo & Associates, Inc.; Evelyn A Defillo

(57) ABSTRACT

The present invention includes an inner anticorrosive and abrasive resistant coating (10) for steel pipes (1) used for the transport of fluids. The coating includes: a layer of epoxy resin (2) having free hydroxyl groups, which are applied directly to the inside 1a of the steel pipe (1); a layer of thermoplastic adhesive (3) applied directly onto the layer of epoxy resin; and a layer of 12-Aminododecanoic acid lactam with the formula ($C_{12}H_{23}NO$), which is applied directly onto the layer of adhesive.

4 Claims, 3 Drawing Sheets

Termoplastic (ex PEEK)

INTERNAL ANTICORROSIVE AND ABRASIVE RESISTANT PROTECTION COATING FOR STEEL PIPES

FIELD OF THE INVENTION

The present invention is related to an internal anticorrosive and abrasive resistant protection coating for steel pipes.

BACKGROUND OF THE INVENTION

The world market offers a great variety of coating options to protect the inner surface of pipes used for the transport of fluids from the effects of corrosion and erosion. Some, additionally, exhibit features that allow the reduction of friction and turbulence, thus, increasing the efficiency of flow. Among the alternatives to anticorrosive coatings, one can find those based on liquid epoxy; the epoxy coating is adhered by fusion and the special anticorrosive paints.

Among the main features of these coatings, they exhibit adaptation to corrosive environments, resistance to various solvents and chemical products, as well as to cathodic detachment.

The research on inner coatings, along with the technical and metallurgic evolution required by pipes and accessories, has resulted in the development of coating that satisfies all kinds of needs.

A very common kind of coating is cement mortar lining, which fulfills the standards set forth in ISO 4179 and AWWA C104 for use in water distribution systems and sewerage systems. The ceramic epoxy coating for gravity-operated septic tanks and sewerage systems and the special inner coating for specific service conditions.

Inner cement lining is done by making the pipe rotate at high angular velocity coupled with vibration that produces a dense coating.

The high centrifugal speed allows the coating to become smooth, dense and perfectly compact.

The Hazen-Williams formula has determined that the coefficient of friction is 140 for cement linings and 150 for polyethylene and epoxy coatings.

Other anticorrosive and abrasive resistant protections consist in placing plastic liners inside the pipes. However, said liners are not adhered to the metal. They are simply attached at the ends of the pipe to avoid displacement.

Prior art shows a steel pipe inner coating made of high-density consolidated polyethylene. Also, prior art shows a steel pipe with an insulating inner coating and a fiber-filled thermoplastic liner placed inside a steel pipe.

Besides, prior art shows an inner coating for pipes made up of a highly heat-resistant TPU-Polyester lining which allows a nonwoven fabric to be saturated with an epoxy-amine resin and to be cured with steam or hot water.

There is a coating made up of a solixane-based elastomer processable by heat fusion, a coating made of a thermoplastic material, and a thermoplastic coating applied to the inside of the pipe by injecting gas that pushes the material against the inner surface of the pipe.

Even though all the known coatings in the field of technique yield the desired results for their specific purpose, the known coatings do not, unfortunately, include a plastic coating that can strongly adhere to pipes, so that it can withstand pressure drops of the magnitudes present in oil and gas production pipelines.

Nor does prior art show a coating that can make pipes impermeable to liquids and gases simultaneously.

In addition to solving the previous points, the proposed invention also shows a yet-inexistent procedure in the prior art, whereby a layer of adhesive thermoplastic is applied between an epoxy adhesive and material of the plastic pipe so as to achieve a full adherence of the various components and steel of the metal pipe.

Finally, neither is there in the state of the art, and the invention does describe this, a procedure that includes a step whereby a plastic pipe is pressed against the surface of the steel pipe, while simultaneously applying heat at a temperature higher than the point of softening of the thermoplastic material, but without damaging the material.

SUMMARY OF INVENTION

It is an object of the present invention to have a thermoplastic coating that adheres to the inside of pipes with such strength that it will counteract the strength of pressure drops present in oil and gas production pipelines.

It is another object of the revealed procedure that the inner coating of the steel pipe is impermeable to the transported liquids and gases.

It is another object of the present invention to provide a layer of thermoplastic adhesive between the epoxy layer and the material of the plastic pipe.

It is also an object of the present documentation to have a procedure including the steps to press the plastic pipe against the wall of the metal pipe while simultaneously applying temperature.

Finally, it is an object of this invention to have a steel pipe lined with an inner plastic pipe, and between said pipes there is a layer of adhesive and a layer of epoxy.

The present invention includes an anticorrosive and abrasive resistant inner coating for steel pipes used to transport fluids. The coating includes: a layer of epoxy resin having free hydroxyl groups, which is applied directly to the inside wall of the steel pipe; a layer of thermoplastic adhesive applied directly onto the layer of epoxy resin, the thermoplastic adhesive is anhydride modified polyolefin or acrylic acid modified polyolefin; and a layer of 12-Aminododecanoic acid lactam with the formula ($C_{12}H_{23}NO$), which is directly applied onto the adhesive layer.

DETAILED DESCRIPTION OF THE INVENTION

With the aim to make the present invention comprehensible so that it can be applied easily, a precise description of the preferred method for manufacturing will be presented in the following paragraphs. Said description includes a diagram illustrating the invention. Said description and diagram cannot be regarded in any way as limiting the invention. The components mentioned in the description can be selected among various equivalents, but without deviating from the principles of the invention set forth in the current documentation.

The present invention includes an inner anticorrosive and abrasive resistant coating for steel pipes used for the transport of fluids. The coating includes:

a layer of epoxy resin having free hydroxyl groups, which is applied directly to the inside of the steel pipe;

a layer of thermoplastic adhesive applied directly onto the layer of epoxy resin, the thermoplastic adhesive is anhydride modified polyolefin or acrylic acid modified polyolefin;

and a layer of 12-Aminododecanoic acid lactam with the formula ($C_{12}H_{23}NO$), which is directly applied onto the layer of adhesive.

Epoxy Resin

The epoxy resin used in the present invention may be any resin that contains free hydroxyl groups.

Figure 1:
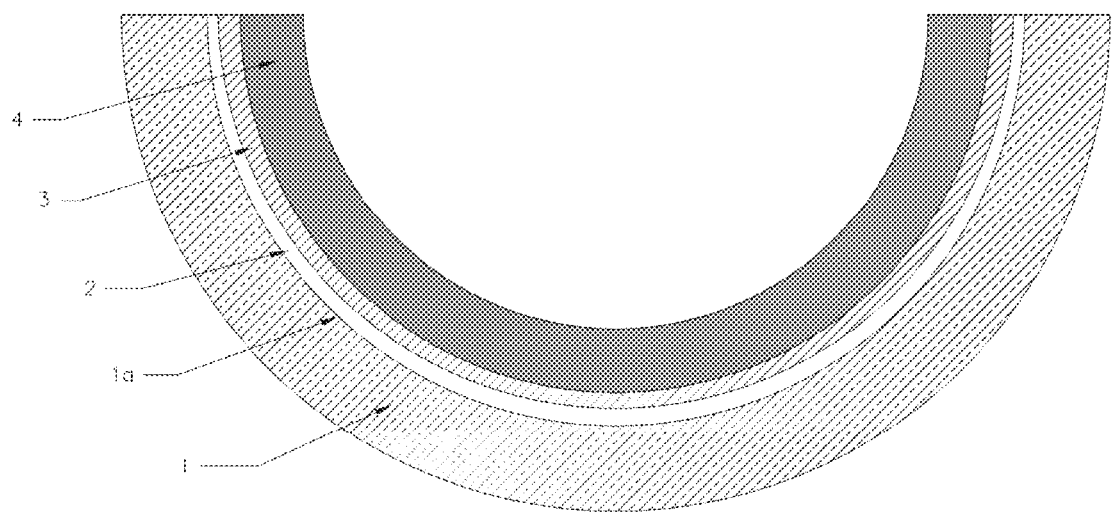
FIG. 1 illustrates a cross section of the steel pipe 1, which includes the coating as described in the present invention.
Figure 2:
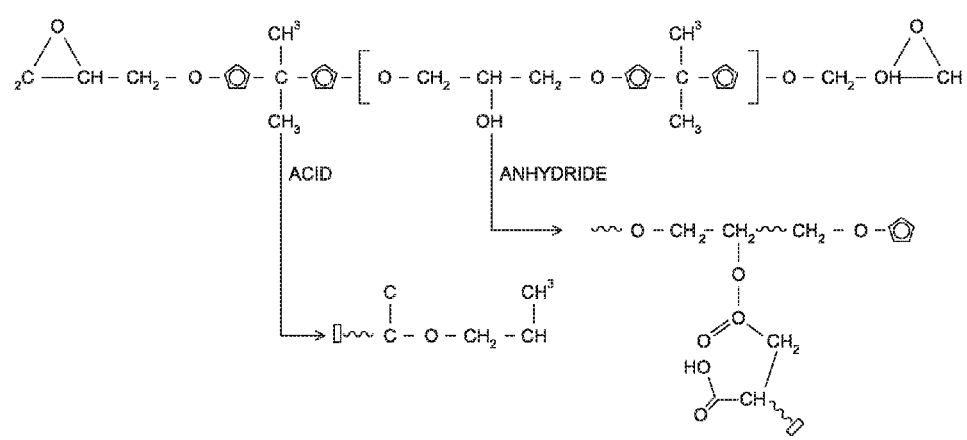
FIG. 2 shows a diagram which represents the chemical bonds formed through electron sharing by groups on the substrate and epoxy resin.

The epoxy resin having free hydroxyl groups adheres to the metallic surface because of the chemical bonds formed through electron sharing by groups on the substrate and the free hydroxyl groups of the epoxy resin, the curing is accompanied by polarity change (See FIG. 2).

It will be understood that the curing phenomenon of epoxy resin compositions involves chemical linking between polymer chains and that this linking (or "cross-linking") mechanism is initiated almost immediately upon application of the epoxy resin upon a hot surface and continues as the epoxy resin composition melts, coalesces and gels.

Examples of preferred epoxy resins having free hydroxyl groups useful in the present invention are Epoxy, Phenolic Epoxy, Polyurethane Epoxy, and/or Novolac®.

The thickness of the layer of epoxy resin is at least 30 microns, preferably between 30 and 250 microns.

Thermoplastic Adhesive

In the preferred method for manufacturing described in the present documentation, the adhesive (3) is of the thermoplastic type and it allows a chemical bond with the epoxy of the first layer (2) so as to obtain full adherence to the metal.

Figure 3:
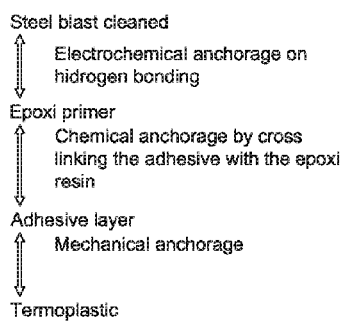
FIG. 3 shows a diagram that represents the chemical structure of the thermoplastic adhesive of the present invention.
Figure 3:
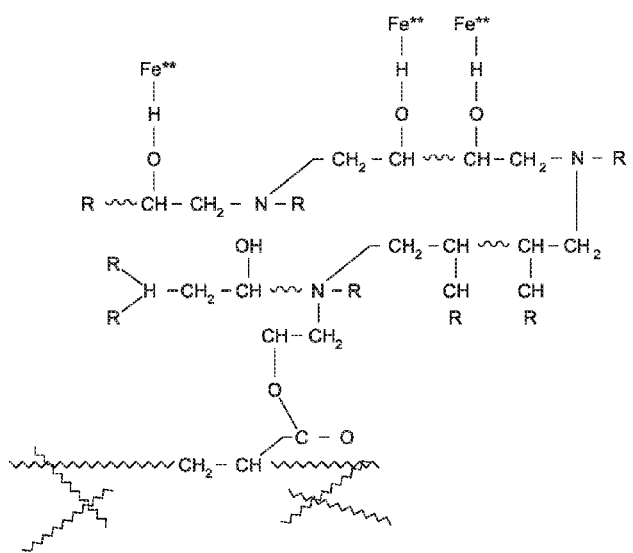

The thermoplastic adhesive used in the present invention may be Anhydride modified polyolefin or acrylic acid modified polyolefin, since the epoxy resins have free hydroxyl groups anhydride or acrylic acid adhesive that can react to form very strong bonds to the epoxy (See FIG. 3).

Epoxy resin combines very low permeability to oxygen with excellent adhesion to properly prepared metallic surfaces and excellent resistance to cathodic disbondment. However, it is permeable to moisture, and is easily damaged by mechanical impacts. It is therefore beneficial to cover the epoxy resin with a layer of a polymer that is highly resistant to moisture permeation and resistant to impact damage.

Polyolefin coatings are widely used to protect metal pipelines, especially oil and gas pipelines, from both corrosion and mechanical damage. Unfortunately, the actual thermoplastic internal coating or polyolefins liners are not bonded to epoxy resin. The present invention uses modified polyolefins that contain polar groups to bond to the epoxy resin layer.

It is to be understood that the term "modified polyolefin", as used in the present invention, includes not only a polyolefin that is modified with an unsaturated carboxylic acid or an anhydride thereof, that is, a polyolefin copolymerized with the unsaturated carboxylic acid or the anhydride thereof, but also includes a blend of a polyolefin modified with the unsaturated carboxylic acid or anhydride thereof and an unmodified polyolefin.

The epoxy resin free hydroxyl-groups and the carboxylic acid dimer hydrogen bonding produces an epoxy resin-anhydride system. The gelation phase of reaction exhibits rapid initial hydroxyl-anhydride reactions.

The acid or anhydride modified polyolefins of the invention are, in most cases, acid or anhydride modified polyethylenes, polypropylenes, or combinations thereof. Most preferably the polyolefins of the invention are acid or anhydride modified polypropylenes, acid or anhydride modified polypropylene derivatives, or mixtures of these. The acid or anhydride modified polyolefin component of the invention may also be mixtures of acid or anhydride modified polyolefins with unmodified polyolefins. Preferably, if the emulsion comprises several polyolefins, most of the polyolefins have grafted thereto at least one acid or anhydride. The acids or anhydrides grafted on the polyolefins may be, in particular, ethylene-substituted carboxylic acids and/or polycarboxylic acids and/or acid anhydrides, such as, for example, maleic, acrylic, methacrylic, itaconic or citraconic acid (or anhydride). Most preferably the acid or anhydride modified polyolefins of the invention are maleic anhydride modified polypropylenes.

Examples of preferred acid or anhydride modified polyolefin dispersions useful in the present invention are maleic anhydride grafted polypropylene dispersions such as Hydrosize XM-10075, Hydrosize PP2-01, Hydrosize PPI-OI (all from Hydrosize Technologies, Inc., Raleigh, N.C.) and Michem Emulsion 91735 (available from Michelman, Inc., Cincinnati, Ohio).

The thickness of the layer of the adhesive is at least 50 microns, preferably between 50 and 300.

12-Aminododecanoic Acid Lactam

Onto the layer of thermoplastic adhesive (3) a fourth layer of plastic material is applied. This makes up the inner protection, which is very effective against abrasion and corrosion caused by fluids transported through steel pipes (1).

Preferably, examples thereof include 12-Aminododecanoic acid lactam with the formula ($C_{12}H_{23}NO$).

The lactam poly 12-aminododecanoic acid is fused plastically with the adhesive of the layer of thermoplastic material (3) and the layer of epoxy resin (2) achieving complete adhesion to the metal.

The 12-Aminododecanoic acid lactam is also known as 12-Aminodecanolactam; 1-Aza-2-cyclotridecanone; 12-Aminododecanoic acid lactam; 2-Oxododecamethylenimine; Azacyclotridecan-2-one; Cyclododecalactam; Dodecalactam, Dodecanoic acid; 12-amino-, lactam; Dodecanolactam; Dodecyllactam; Laurin lactam; Laurolactam; Lauryl lactam; omega-Dodecalactam; Dodecane-12-lactam.

The 12-Aminododecanoic acid lactam has low moisture uptake, excellent ductility, good electrical properties, and significant chemical and impact resistance.

The amide groups (—CO—NH—) of the 12-Aminododecanoic acid lactam forms hydrogen bridge bonds between the chains of the macromolecules, thereby substantially promoting crystallinity and increasing their strength, and resistance to chemicals. 12-Aminododecanoic acid lactam1 has the lowest amide group concentration of all commercially available monomers, giving it the lowest moisture absorption and higher stability.

The 12-Aminododecanoic acid lactam1 has the following properties:

high mechanical strength, elasticity and surface hardness;
low water absorption and water vapor permeability;
low thermal conductivity; and
good electrical insulation and dielectric strength.

The thickness of the layer of the 12-Aminododecanoic acid lactam1 is between 1 mm to 8 mm.

The epoxy resin layer (2) is applied onto the inner surface (1a) of the steel pipe (1). Once the pipe has been burned (1) and later cleaned (abrasive blasting) with an abrasive material so as to eliminate contaminants, the inside surface (1a) of the pipe (1) will be clean and ready for the epoxy resin (2) to be applied.

Before applying the epoxy resin (2), the steel pipe (1) will be burned. In the burn-off step the temperature must be controlled so as not to alter the metallographic conditions of the steel pipe (1). For this reason, the burn-off temperature must not exceed 350° C. This temperature will easily eliminate oils, grease, and fuel residues that might be covering inside of the steel pipe (1). On the other hand, the applied temperature must not be lower than 100° C., since below that level the desired burn-off will not be achieved.

The abrasive blasting step seeks to prepare the inner surface of the steel pipe (1) by complementing the burn-off described in the previous step and, thus, improving the adherence of the epoxy resin (2). In the preferred method for manufacturing described, the abrasive blasting is done with non-contaminating material, preferably using $O_2Al_3$ grit.

Then comes a heating step whereby the pipe (1) is heated at a temperature of between 120° C. and 180° C., since this temperature improves the curing of the epoxy resin (2), which is applied at a later step before it completes its polymerization. In the preferred method for manufacturing in the present documentation, in the step where the steel pipe is heated, the heat is applied onto the exterior surface of said steel pipe (1).

The next step involves applying a layer of epoxy resin on the inner surface (1a) of the steel pipe (1). The epoxy resin can be applied in liquid, granular, or powder form.

Then a layer of thermoplastic adhesive (3) is applied directly onto the layer of the epoxy resin (2) while raising the temperature of the steel pipe, thus, achieving a chemical bond between said epoxy resin layer (2) and the thermoplastic adhesive layer (3). This makes the adhesive 3 come into close contact with the epoxy resin (2). Hence, in the step where temperature is raised, said epoxy resin (2) will be cured. The polymerization of the epoxy resin (2) and the fusion of the adhesive (3), which result from the step where temperature is raised to ensure a very strong chemical coupling, due to union of the carboxyl groups and the epoxy groups. As in the previous heating step, in the step where the temperature is raised, the steel pipe 1 is heated from the outside, so that in both cases the temperature reaches the inner surface 1a of said steel pipe (1) by conduction.

The temperature at which the steel pipe 1 is heated in the heating step depends on the thickness and diameter of the steel pipe 1. Of course, it is closely related to the composition and the temperature of the product that will be transported.

In the preferred method described in the present documentation, the temperature at which the steel pipe is heated ranges between 180° C. and 350° C.

The layer of 12-Aminododecanoic acid lactam (4) is pressed against the layer of thermoplastic adhesive by injecting a fluid (gaseous or liquid) at high pressure into the pipe, while the steel pipe (1) is heated from the outside, thus, achieving the fusion between said adhesive and said plastic.

To determine the level of adherence to the metal, the inventors have conducted several trials following the CSA Standard Z 245.21-06 (Canadian Standard Association), Peel Adhesion (hanging mass) for System B1: >15.3 Kg/25 mm, 20° C.

The level of adherence obtained is higher than 15.3 Kg/25 mm at a temperature of 20° C.

Through the tests conducted, it is determined that the set of three layers on the inner surface of the steel pipe (1) can withstand sharp pressure drops at temperatures ranging from −30° C. to 110° C., in accordance to the prescribed values in the autoclave trial defined in the NACE TM0185 specification.

In compliance with the specification, it is subjected during 20 days to pressures of up to 273 atm and temperatures of up to 110° C. The fluids used in the trial were kerosene, toluene, and formation water with 12% ClNa and gaseous phase CO2.

Above, this document describes one possible method to produce the invention and the way the invention works. Additionally, this documentation is supplemented with a summary of the invention contained in the claims that are added below.

The invention claimed is:

1. An inner coating (10) providing anticorrosive and abrasive resistant protection for steel pipes (1) used for the transport of fluids, the coating includes:
   a layer of epoxy resin having free hydroxyl groups (2) applied directly onto the inner surface 1a of the steel pipe (1);
   a layer of thermoplastic adhesive (3) applied directly onto the layer of epoxy resin, the thermoplastic adhesive is anhydride modified polyolefin or acrylic acid modified polyolefin; and
   a layer of 12-Aminododecanoic acid lactam whose formula is (C12H23NO), which is applied directly onto the layer of adhesive.

2. The coating of claim 1, wherein the coating has a level of adherence higher than 15.3 Kg/25 mm at a temperature of 20° C., in accordance to CSA Standard Z 245.21-06 (Canadian Standard Association), Peel Adhesion (hanging mass) for System B1.

3. The coating of claim 1, wherein it withstands sharp pressure drops at temperatures ranging from 30° C. below zero to 110° C.

4. An internally lined steel pipe with an inner coating providing anticorrosion and abrasive resistant protection of the pipe, the coating includes:
   a layer of epoxy resin having free hydroxyl groups (2) applied directly onto the inner surface 1a of the steel pipe (1);
   a layer of thermoplastic adhesive (3) applied directly onto the layer of epoxy resin, the thermoplastic adhesive is anhydride modified polyolefin or acrylic acid modified polyolefin; and
   a layer of 12-Aminododecanoic acid lactam whose formula is (C12H23NO), which is applied directly onto the layer of adhesive.

* * * * *